A. S. MOSHEIM.
POWDER PUFF AND METHOD OF MAKING THE SAME.
APPLICATION FILED APR. 5, 1919.
1,357,411.
Patented Nov. 2, 1920.
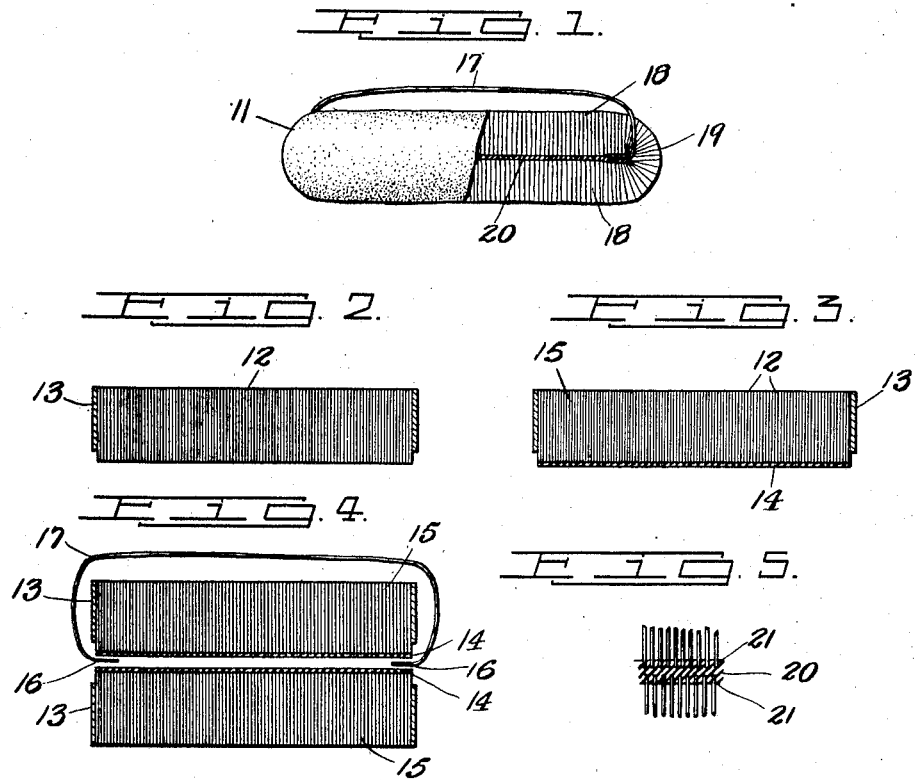
Inventor
Albert S. Mosheim
By his Attorneys
Edgar Tate & Co.

UNITED STATES PATENT OFFICE.

ALBERT S. MOSHEIM, OF EAST ORANGE, NEW JERSEY, ASSIGNOR OF ONE-HALF TO GUSTAVE MOSHEIM, OF NEW YORK, N. Y.

POWDER-PUFF AND METHOD OF MAKING THE SAME.

1,357,411.   Specification of Letters Patent.   Patented Nov. 2, 1920.

Application filed April 5, 1919. Serial No. 287,674.

*To all whom it may concern:*

Be it known that I, ALBERT S. MOSHEIM, a citizen of the United States, and residing at East Orange, in the county of Essex and State of New Jersey, have invented certain new and useful Improvements in Powder-Puffs and Methods of Making the Same, of which the following is a specification, such as will enable those skilled in the art to which it appertains to make and use the same.

This invention relates particularly to the manufacture of what are known as powder puffs, and the invention consists of an improved process for the manufacture of such devices, and in the article or articles produced by such process; and the object of the improved process is to provide a device or devices of the class described which is sanitary in use and which may be washed or cleaned when desired; a still further object being to provide an improved process for manufacturing powder puffs whereby said manufacture is rendered more simple and economical and whereby a better article of the class specified is produced; and with these and other objects in view the invention consists in the improved process herein described for manufacturing powder puffs and in the article produced by such process.

The process described and claimed herein is what I call the rubberset process in which rubber or other adhesive material is used for the purpose of binding the puff material in position, and the invention constituting the subject-matter of this application is fully disclosed in the following specification, of which the accompanying drawing forms a part, in which the separate parts of my improvement are designated by suitable reference characters in each of the views, and in which:—

Figure 1 is a side view of a complete powder puff made according to my invention with part of the construction broken away or shown in section;

Figs. 2, 3 and 4 are detail views showing separate steps of the method; and

Fig. 5 an enlarged view showing a specific detail of the construction employed;

In Figs. 1 to 5 inclusive, I have shown one form of powder puff and the steps in the process of making the same.

In Fig. 1, I have shown at 11 the completed powder puff and in manufacturing said puff a large number of wool, cotton or silk fibrous strands 12 cut to the desired length as shown in Fig. 2 are passed into and held in a sleeve 13, after which a coating of rubber 14 in a liquid or plastic state is applied to one end of the strands 12 when supported in the sleeve 13, as clearly shown in Fig. 3, after which two of the fibrous bodies 15 thus formed and as is shown in said figure are brought together, as is illustrated in Fig. 4, and the opposite end portions 16 of a ribbon or band 17 are placed between said fibrous bodies 15 as shown in said figure, after which said bodies are pressed slightly together, while the liquid or plastic rubber is still in its liquid or plastic state and the fibrous bodies thus connected are allowed to dry, and this completes the formation of the powder puff as shown at 11 in Fig. 1 of the drawing, which comprises opposite fibrous faces 18 made from the separate fibrous bodies 15, and the periphery of the puff 11 is rounded or made smooth and even in form as shown at 19 by the releasing of the fibrous bodies 15 from the casings 13, in which said fibrous bodies are compressed in the usual manner.

The puff formed in the manner above set out produces what I call a rubber-set powder puff, or powder puff in which the separate wool, cotton or silk fibrous strands of the inner ends thereof are set and secured in a strip of rubber 20, as clearly shown at 21 in Fig. 5 of the drawing. The rubber strip 20 is formed by the application of liquid or plastic rubber to the fibrous bodies 15 as above set out. A powder puff made in the manner set out will be absolutely sanitary by reason of the fact that the same may be washed whenever desired, and no collection of paste-like or other matter will collect in the central portion of the puff as heretofore customary with fabric backed powder puffs, and it will also be understood that the puff will be flexible and allowed to stretch, or expand and contract by reason of the elastic qualities of the rubber strip 20.

It will be understood that while I have specifically specified the use of rubber as the preferred binding substance, any binding or adhesive substance having similar qualities or that would stand the wear and tear of devices of the class under consideration may be employed. My invention is also not limited to the specific methods herein set out nor to the specific form and construction of powder puffs herein shown and described, and various other changes in and modifications of the method of manufacturing powder puffs and the articles so produced, as herein set out, may be made, within the scope of the appended claims, without departing from the spirit of my invention or sacrificing its advantages.

Having fully described my invention, what I claim as new and desire to secure by Letters Patent, is:—

1. The herein described method of manufacturing two-faced powder puffs which consists in providing fabric strand bodies of predetermined dimensions, applying an adhesive substance to one face of each of said bodies and then placing said faces of two of said bodies so treated together to form a complete powder puff.

2. The herein described method of making two-faced powder puffs which consists in providing two bodies of fabric strands, applying rubber in a liquid state to one side face of each of said bodies and then placing the rubberized faces of said bodies thus treated together to produce a complete puff, each of the fabric strands of which is set in rubber.

3. A two-faced powder puff of the class described, comprising two similar body portions each of which is composed of a plurality of fabric strands, and an intermediate sheet composed of adhesive material to the opposite faces of which the separate fabric strands of said body portion are secured.

4. A two-faced powder puff of the class described composed of two similarly formed body portions each of which is composed of a plurality of fabric strands, and the adjacent faces of said body portions being secured together by a sheet of rubber in which the separate strands of each of said body portions are set.

In testimony that I claim the foregoing as my invention I have signed my name in presence of the subscribing witnesses this 3rd day of April, 1919.

ALBERT S. MOSHEIM.

Witnesses:
C. E. MULREANY,
H. E. THOMPSON.